Jan. 16, 1923.
E. E. WICKERSHAM.
TRACTOR FRAME SUSPENSION.
FILED SEPT. 29, 1919.
1,442,551
2 SHEETS-SHEET 2
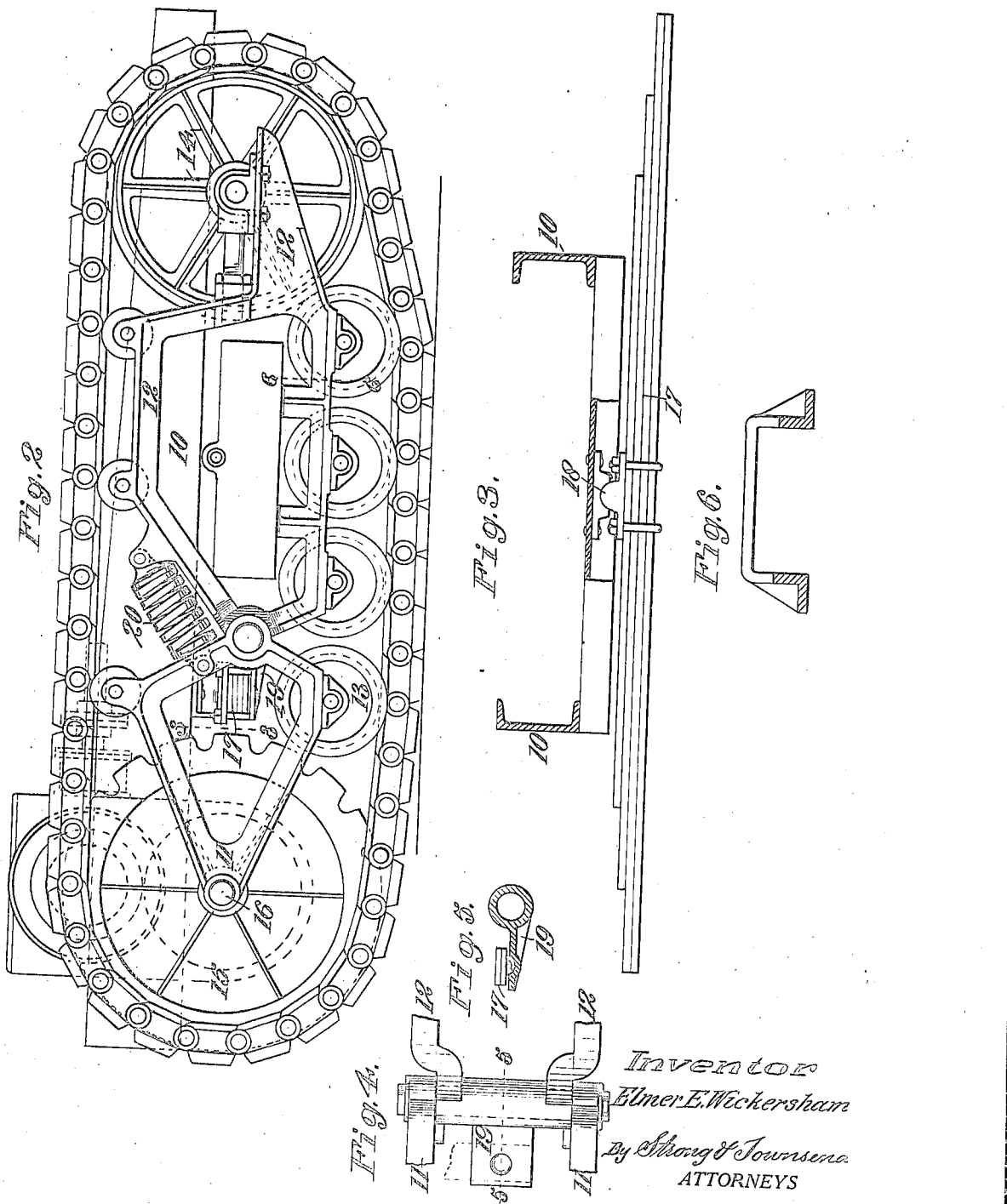
Inventor
Elmer E. Wickersham
By Strong & Townsend
ATTORNEYS Patented Jan. 16, 1923.

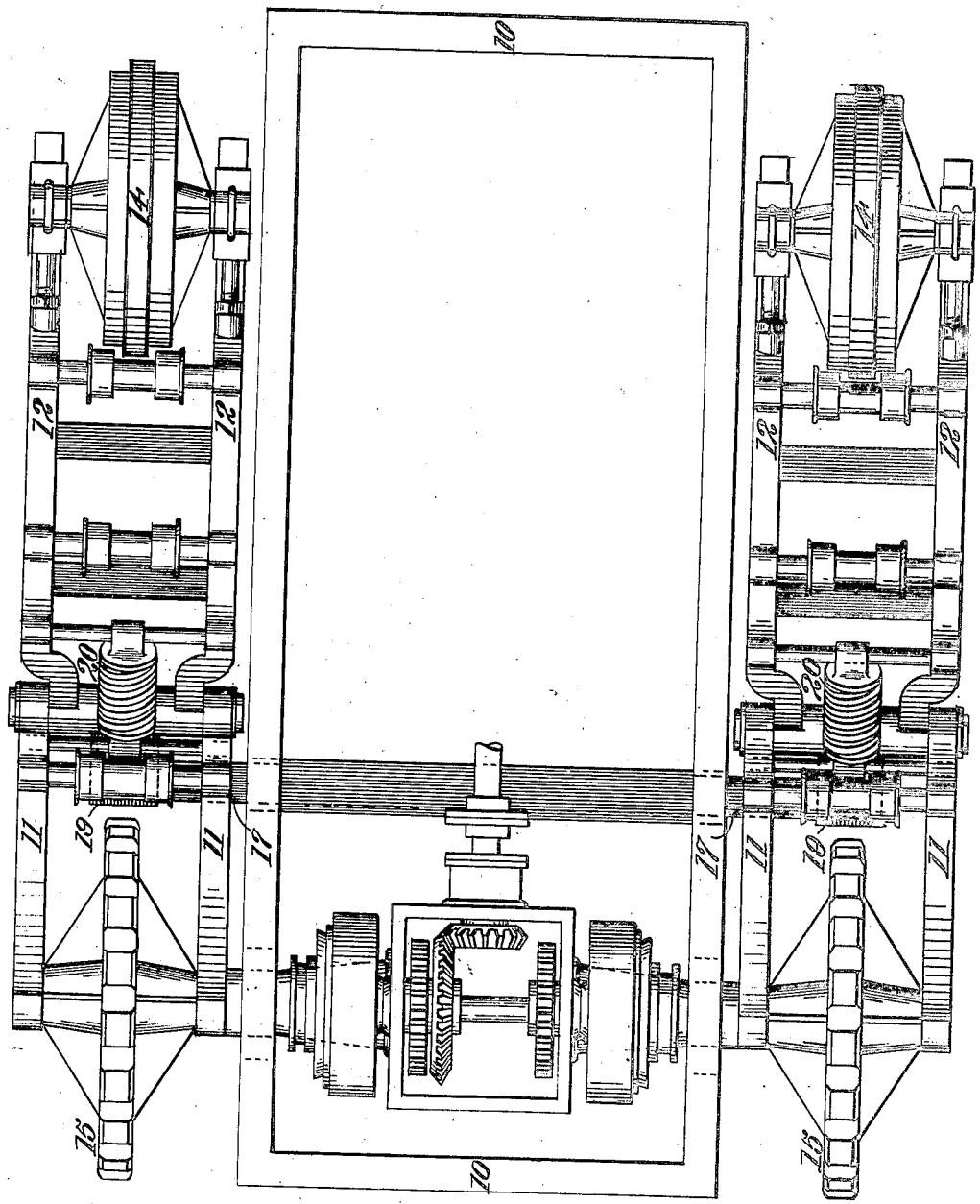

1,442,551

UNITED STATES PATENT OFFICE.

ELMER E. WICKERSHAM, OF STOCKTON, CALIFORNIA, ASSIGNOR TO THE HOLT MANUFACTURING COMPANY, OF STOCKTON, CALIFORNIA, A CORPORATION OF CALIFORNIA.

TRACTOR FRAME SUSPENSION.

Application filed September 29, 1919. Serial No. 327,287.

*To all whom it may concern:*

Be it known that I, ELMER E. WICKERSHAM, a citizen of the United States, residing at Stockton, in the county of San Joaquin and State of California, have invented new and useful Improvements in Tractor Frame Suspensions, of which the following is a specification.

This invention relates to tractors of the chain track type, and more particularly to suspension means for the main frame.

In a companion application filed of even date herewith and entitled "Tractor frame suspension Serial No. 327,286" I show a suspension means for the main frame having a single point of connection with the truck mechanisms, each truck mechanism being made up of hinged sections. The present application relates to the same general system of suspending the main frame at one point on an articulated truck mechanism, the difference from the above-mentioned case being that the leaf spring on which the weight of the main frame is carried is connected to the truck mechanism by means of a rearwardly extending arm on the hinged bearing of the front truck section and the front truck section is held against tilting upwardly by a pressure spring interposed between the two truck sections. The weight of the load is thus evenly distributed on both truck sections.

Referring to the accompanying drawings:

Fig. 1 shows a plan view of a tractor embodying my invention.

Fig. 2 shows a side elevation of the same.

Fig. 3 shows a sectional view taken on the line 3—3 of Fig. 2.

Fig. 4 shows a detail view in plan of the hinge connection between the truck sections.

Fig. 5 shows a detail sectional view taken on the line 5—5 of Fig. 4.

Fig. 6 is a cross section on line 6—6 of Fig. 2.

10 indicates the main frame of the tractor, at each side of which is an endless self-laying track truck mechanism comprising front and rear roller frame sections 11 and 12 on which are journaled one or more supporting rollers 13. The front frame section carries the idler wheel 14 and the rear section carries the driving sprocket wheel 15. The drive shaft 16 for the sprocket wheel is also journaled on the main frame, and thereby forms a pivot about which the truck mechanism as a whole may rock.

For supporting the main frame upon the truck mechanisms I provide a transversely extending laminated leaf spring 17 having a central rocking connection 18 with the main frame, and resting at each end upon an arm 19, which arm is formed by the hinge bearing of the forward truck section. A compression spring 20 is interposed between the front and rear truck sections so that the tendency of the front section to tilt upwardly, due to the weight of the main frame acting on the arm 19, will be restrained and the load will be transmitted to the rear truck section. Obviously, the main frame while it is supported at but one point upon each truck mechanism will be stabilized on account of the connection formed between the rear truck section and the main frame by the presence of the drive shaft 16. This, however, is not a load-supporting connection in any sense inasmuch as the preponderance of weight upon the main frame is disposed forwardly of the leaf spring 17 and the tendency therefore is to lift the rear truck section. This lifting tendency is restrained by the spring 20 interposed between the front and rear truck sections. It will also be noted that the connection 18 between the leaf spring and main frame is such as to permit the main frame to maintain a level position when one truck mechanism is raised higher than the other.

Having thus described my invention, what I claim and desire to secure by Letters Patent is:

1. In a vehicle, a main frame, a truck mechanism at each side comprising hinged truck sections, an idler wheel on the front section and a driving sprocket wheel on the rear section, the latter having its axle journaled on the main frame, an equalizer bar pivotally connected to the main frame and having a single point of connection with each truck mechanism bearing upon the hinged point between said sections and spring means interposed between said hinged sections tending to keep them in horizontal alignment.

2. In a vehicle, a main frame, a truck mechanism at each side comprising hinged truck sections, an idler wheel on the front section and a driving sprocket wheel on the rear section, the latter having its drive shaft journaled on the main frame, an equalizer bar pivotally connected to the main frame, a rearwardly extending arm on the hinge bearing of the front truck section supporting said equalizer bar at its end and spring means between the two sections of each truck mechanism for maintaining said sections in a straight line.

3. In a vehicle, a main frame, a truck mechanism at each side pivotally connected to the main frame for rocking movement in a vertical plane, each of said truck mechanisms comprising front and rear sections, a hinged connection between said sections, a load-bearing connection for the main frame resting on said hinged joint and spring means interposed between the truck sections tending to maintain them in horizontal alignment.

4. In a vehicle, a main frame, a truck mechanism at each side comprising front and rear hinged truck sections, a sprocket wheel on the rear section having its axle journaled on the main frame, a sprocket wheel on the front section disconnected from the main frame, a transversely extending load-carrying member for the main frame bearing at each end upon the hinge between said truck sections, and spring means between the truck sections exerting a downward thrust on the front section.

In testimony whereof I have hereunto set my hand in the presence of two subscribing witnesses.

ELMER E. WICKERSHAM.

Witnesses:
  GLADYS SCHERMERHORN,
  IRENE BUGBEE.